United States Patent [19]

Perez-Mendez et al.

[11] Patent Number: 5,548,123
[45] Date of Patent: Aug. 20, 1996

[54] HIGH RESOLUTION, MULTIPLE-ENERGY LINEAR SWEEP DETECTOR FOR X-RAY IMAGING

[75] Inventors: Victor Perez-Mendez, Berkeley; Claude A. Goodman, Kensington, both of Calif.

[73] Assignee: Regents of the University of California, Oakland, Calif.

[21] Appl. No.: 350,854

[22] Filed: Dec. 6, 1994

[51] Int. Cl.⁶ .................................................. G01T 1/16
[52] U.S. Cl. ............................. 250/370.11; 250/370.09
[58] Field of Search .................... 250/370.06, 370.11, 250/370.09; 378/5

[56] References Cited

U.S. PATENT DOCUMENTS

| | | | |
|---|---|---|---|
| 4,511,799 | 4/1985 | Bjorkholm | 250/370.06 |
| 4,626,688 | 12/1986 | Barnes | 250/370.06 |
| 5,103,100 | 4/1992 | Iketaki | 250/370.06 |
| 5,138,167 | 8/1992 | Barnes | 250/370.06 |

*Primary Examiner*—Davis L. Willis
*Assistant Examiner*—Richard Hanig

*Attorney, Agent, or Firm*—Paul R. Martin

[57] ABSTRACT

Apparatus for generating plural electrical signals in a single scan in response to incident X-rays received from an object. Each electrical signal represents an image of the object at a different range of energies of the incident X-rays. The apparatus comprises a first X-ray detector, a second X-ray detector stacked upstream of the first X-ray detector, and an X-ray absorber stacked upstream of the first X-ray detector. The X-ray absorber provides an energy-dependent absorption of the incident X-rays before they are incident at the first X-ray detector, but provides no absorption of the incident X-rays before they are incident at the second X-ray detector. The first X-ray detector includes a linear array of first pixels, each of which produces an electrical output in response to the incident X-rays in a first range of energies. The first X-ray detector also includes a circuit that generates a first electrical signal in response to the electrical output of each of the first pixels. The second X-ray detector includes a linear array of second pixels, each of which produces an electrical output in response to the incident X-rays in a second range of energies, broader than the first range of energies. The second X-ray detector also includes a circuit that generates a second electrical signal in response to the electrical output of each of the second pixels.

18 Claims, 5 Drawing Sheets

HIGH RESOLUTION, MULTIPLE-ENERGY LINEAR SWEEP DETECTOR FOR X-RAY IMAGING

The invention described herein was made with Government support under contract DE-AC03-76SF00098 between the Department of Energy and the University of California. The Government has certain rights to the invention.

FIELD OF THE INVENTION

The invention relates to detectors for X-ray imaging, and, in particular, to detectors that provide simultaneous detection at different X-ray energies.

BACKGROUND OF THE INVENTION

X-ray images have traditionally been recorded by placing an X-ray absorbing scintillator layer and a photographic film adjacent the object, and illuminating the object with X-rays. X-rays that pass through the object cause the scintillator layer to emit light that selectively exposes the photographic film to form an image of the object.

Electronic X-ray imaging has been introduced relatively recently. In electronic X-ray imaging, either the photographic film is replaced by an array of electronic light detectors, or the scintillator layer and the photographic film are replaced by an array of electronic X-ray detectors. Electronic imaging offers a number of advantages of traditional photographic imaging. One important advantage is that the image can be viewed immediately, without the need to wait for the photographic film to be developed. Additionally, electronic X-ray images can be stored, transmitted, and analyzed electronically. Still picture compression techniques can be used to reduced the amount of storage space or transmission time required.

Crystalline silicon photon detectors can be used as electronic X-ray detectors. However, X-ray detectors having a layer of scintillator material coupled to a p-i-n light detector are lower in cost, higher in efficiency, and have greater radiation hardness. In the p-i-n light detector in such X-ray detectors, a P-type layer, an N-type layer, and an intrinsic region between the P-type layer and the N-type layer are formed in a layer of hydrogenated amorphous silicon. At present, a two-dimensional amorphous silicon X-ray detector array covering the size of a conventional X-ray film (up to about 360 mm by 430 mm) is not feasible from the point of view of cost. To overcome this difficulty, the object is mechanically scanned using a linear (one-dimensional) electronic X-ray detector.

To scan the object, either the linear X-ray detector is moved linearly relative to the object, and the X-ray source is rotated to track the X-ray detector, or the X-ray source and the linear X-ray detector array are maintained in a fixed relationship to one another, and the object is moved linearly between them. With either scanning technique, the electrical outputs of all the X-ray detecting elements ("pixels") of the linear X-ray detector provide one line of a rasterized X-ray image. The electrical outputs of all the pixels of the linear X-ray detector for each line of the rasterized X-ray image are stored. When the scan is completed, the rasterized X-ray image is derived from the stored electrical outputs.

Linear amorphous silicon light detectors have recently become more efficient and lower in cost due to their widespread use in facsimile machines. This application has also resulted in the development of techniques for integrating the linear light detector with its associated readout electronics.

A linear X-ray detector can be made using a layer of a suitable scintillator, such as a layer of thallium-activated cesium iodide, and a linear amorphous silicon light detector. However, the spatial resolution of such an arrangement is usually less than the spatial resolution of the light detector because the light generated in the scintillator diffuses laterally in the scintillator layer before it reaches the light detector.

In U.S. Pat. No. 5,171,996, the disclosure of which is incorporated herein by reference, one of the inventors (Perez-Mendez) describes a method of making an X-ray detector in which the scintillator layer is grown on the surface of the light detector in columns perpendicular to the surface. Each column of the scintillator layer acts as a light guide, which significantly reduces the lateral diffusion of the light generated in the scintillator layer. This increases the spatial resolution of the X-ray detector to almost that of the light detector.

Additional information about an object can be determined by making X-ray images of the object at a number of different X-ray energies. Electronic X-ray detection is particularly advantageous for making images of an object at different X-ray energies because it allows additional information to be determined by performing arithmetic operations on the electrical outputs of the pixels obtained at the different X-ray energies. This can be done especially conveniently if the pixel outputs are digitized before processing. However, current techniques of using linear X-ray detectors require that a separate scan be performed at each X-ray energy to gather a set of pixel outputs at each X-ray energy. This means that more time is required to generate a multiple-energy X-ray image than is required to generate a single-energy X-ray image. In medical applications, the need for a scan at each X-ray energy increases the X-ray exposure of the patient. Moreover, additional scans may be needed if the patient moves between successive scans. In all applications, the need to make multiple spatially coherent scans demands increased accuracy from the scanning system and increases the potential X-ray exposure of personnel. Also, multiple scans cannot be used to produce multiple-energy images of moving objects, such as the heart.

The disadvantages of current techniques for generating multiple-energy X-ray images could be overcome by using an electronic X-ray detector that does not require an independent scan to generate an X-ray image at each X-ray energy.

SUMMARY OF THE INVENTION

The invention provides an apparatus for generating plural electrical signals in a single scan in response to incident X-rays received from an object. Each electrical signal represents an image of the object at a different range of energies of the incident X-rays. The apparatus comprises a first X-ray detector, a second X-ray detector stacked upstream of the first X-ray detector, and an X-ray absorber stacked upstream of the second X-ray detector. The X-ray absorber provides an energy-dependent absorption of the incident X-rays upstream of the first X-ray detector, but provides no absorption of the incident X-rays upstream of the first second X-ray detector.

The first X-ray detector includes a linear array of first pixels, each of which produces an electrical output in response to the incident X-rays in a first range of energies. The first X-ray detector also includes a circuit that generates a first electrical signal in response to the electrical output of each of the first pixels.

The second X-ray detector includes a linear array of second pixels, each of which produces an electrical output in response to the incident X-rays in a second range of energies, broader than the first range of energies. The second X-ray detector also includes a circuit that generates a second electrical signal in response to the electrical output of each of the second pixels.

In a first practical embodiment, the first X-ray detector includes a first strip of crystalline silicon having a first surface in which the first pixels are formed. The first surface is disposed substantially perpendicularly to the incident X-rays. The second X-ray detector includes a second strip of crystalline silicon having a second surface in which the second pixels are formed. The second surface is disposed substantially perpendicularly to the incident X-rays. The X-ray absorber includes an X-ray absorbing foil stacked upstream of the first X-ray detector. The second X-ray detector is stacked upstream of the X-ray absorbing foil.

In a second practical embodiment, the apparatus comprises a first X-ray detector and a second X-ray detector stacked upstream of the first X-ray detector.

The first X-ray detector includes a first light detector having a first surface disposed substantially perpendicularly to the incident X-rays. The first light detector includes a linear array of first pixels formed in the first surface. The first X-ray detector also includes a first scintillator layer formed on the first surface. Each of the first pixels produces an electrical output in response to the incident X-rays in a first range of energies. Finally, the first X-ray detector includes a circuit that generates a first electrical signal in response to the electrical output of each of the first pixels.

The second X-ray detector includes a second light detector having a second surface disposed substantially perpendicularly to the incident X-rays. The second light detector includes a linear array of second pixels formed in the second surface. The second X-ray detector also includes a second scintillator layer formed on the second surface. The second scintillator layer provides an energy-dependent absorption of the incident X-rays upstream of the first X-ray detector. Each of the second pixels generates an electrical output in response to the incident X-rays in a second range of energies, broader than the first range of energies. Finally, the second X-ray detector includes a circuit that generates a second electrical signal in response to the electrical output of each of the second pixels.

In the second practical embodiment, the light detectors of the first and second X-ray detectors are preferably a layer of a hydrogenated amorphous semiconductor material such as a-Si:H or a-Ge:H.

In a third practical embodiment, the apparatus comprises a light detector layer having a surface disposed substantially parallel to the incident X-rays, a scintillator layer formed on the surface, and a first X-ray detector and a second X-ray detector formed side-by-side in light detector layer and the scintillator layer.

The first X-ray detector includes a linear array of first pixels formed in a first portion of the light detector layer, and a first portion of the scintillator layer overlaying the first pixels. Each of the first pixels generates an electrical output in response to the incident X-rays in a first range of energies. The first X-ray detector also includes a circuit that generates a first electrical signal in response to the electrical output of each of the first pixels.

The second X-ray detector includes a linear array of second pixels formed in a second portion of the light detector layer. The linear array of second pixels being disposed parallel to, and upstream of, the linear array of first pixels. The second X-ray detector also includes a second portion of the scintillator layer overlaying the second pixels. The second portion of the scintillator layer provides an energy-dependent absorption of the incident X-rays upstream of the first X-ray detector. Each of the second pixels generates an electrical output in response to the incident X-rays in a second range of energies, broader than the first range of energies. The second X-ray detector also includes a circuit that generates a second electrical signal in response to the electrical output of each of the second pixels.

DETAILED DESCRIPTION OF THE INVENTION

The invention provides a multiple-energy linear sweep X-ray detector that enables a multiple-energy X-ray image of an object to be generated using a single scan. The multiple-energy linear sweep X-ray detector according to the invention enables a multiple-energy image of an object to be generated with a single X-ray exposure, eliminates the need to prevent the object from moving between consecutive scans, and enables a multiple-energy image of a moving object to be generated.

Figure 1:
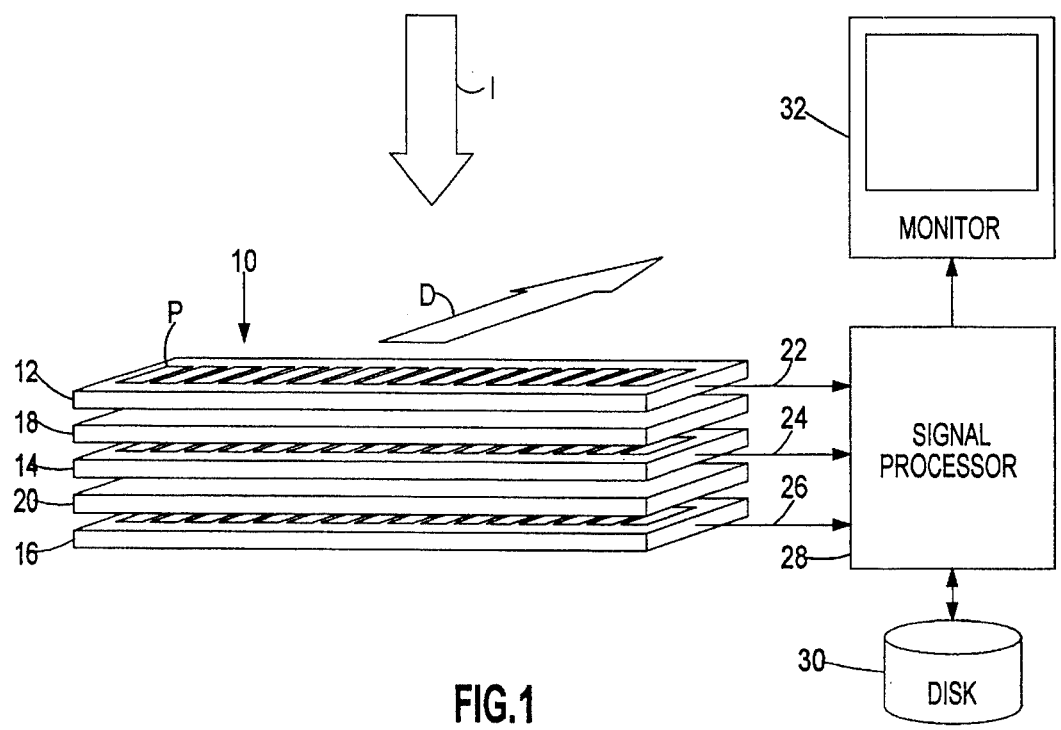
FIG. 1 is a schematic representation of a high resolution multiple-energy linear sweep X-ray detector according to the invention.

The basic arrangement of the multiple-energy linear sweep X-ray detector according to the invention is shown schematically in FIG. 1. In FIG. 1, a detector for detecting X-rays at three energies is shown as an example. The arrangement shown in FIG. 1 can easily be adapted to detect X-rays at more or fewer energies by adding or removing X-ray detector and X-ray absorber elements. In the multiple-energy linear sweep X-ray detector 10 shown in FIG. 1, three X-ray detectors 12, 14, and 16 are stacked in the direction of the incident X-rays I from the object (not shown). The X-ray detectors are arranged with their long axes perpendicular to the direction of scanner motion D and to the direction of the incident X-rays.

As mentioned above, scanning can be provided by moving the multiple-energy linear sweep X-ray detector 10 in the direction D relative to a stationary object, or by keeping the multiple-energy linear sweep X-ray detector in a fixed position and moving the object in the direction D. If the multiple-energy linear sweep X-ray detector is moved, the X-ray source is rotated to track the detector.

The incident X-ray beam is resolved into energy-dependent components by X-ray absorbing elements located ahead of all but the one of the X-ray detectors closest to the X-ray source. In FIG. 1, the X-ray absorbing elements located upstream of (i.e., closer to the object and the X-ray source) each of the X-ray detectors 14 and 16 resolve the incident X-ray beam into energy-dependent components for detection by the X-ray detectors 12, 14 and 16. The X-ray absorbing element shown schematically as the X-ray absorbing element 18 is located upstream of the X-ray detector 14 (i.e., between the adjacent X-ray detectors 12 and 14), and the X-ray absorbing element shown schematically as the X-ray absorbing element 20 is located upstream of the X-ray detector 16 (i.e., between the adjacent X-ray detectors 14 and 16. Absorption of the incident X-rays by the X-ray absorbing element 18 prevents low-energy X-rays from reaching the X-ray detector 14. Absorption of the incident X-rays by the X-ray absorbing element 18 and by the X-ray absorbing element 20 prevents both medium-energy X-rays and low-energy X-rays from reaching the X-ray detector 16. Although not shown, an additional X-ray absorbing element may optionally be included upstream of the X-ray detector 12.

The multiple-energy linear sweep X-ray detector 10 may include discrete X-ray absorbing components as the X-ray absorbing elements 18 and 20. Alternatively, the X-ray absorption of the X-ray absorbing element 18 may be provided by the X-ray detector 12 located upstream of the X-ray detector 14, and the X-ray absorption of the X-ray absorbing element 20 may be provided by the X-ray detector 14 located upstream of the X-ray detector 16.

Each of the three X-ray detectors 12, 14, and 16 includes a single line of plural detection elements (pixels) P arrayed along the long axes of the X-ray detectors. Most of the pixels P are omitted from FIG. 1 for clarity. Each of the pixels P generates an electrical output proportional to the X-ray flux falling on it. Integrated into each of the X-ray detectors 12, 14, and 16, or provided separately, is a set of readout electronics (not shown). The readout electronics for each of the X-ray detectors receives the electrical outputs of the pixels of the X-ray detector and, in the course of a single scan, provides a signal representing a rasterized image of the object in the range of X-ray energies detected by the X-ray detector.

The signal from each of the X-ray detectors 12, 14, and 16 is preferably fed serially to the signal processor 28 via the respective output bus 22, 24, or 26. Alternatively, the signal from each of the X-ray detectors can be fed to the signal processor 28 via a parallel bus or via some other suitable arrangement. As a further alternative, the electrical outputs of the pixels in corresponding positions in each of the X-ray detectors 12, 14, and 16 can be pre-processed (by performing appropriate subtractions, as will be described below, for example) and the results of the pre-processing could be fed to the signal processing electronics 28. The signals from the X-ray detectors are preferably digitized by the readout electronics or by the signal processor 28 to facilitate their storage and processing digitally.

The signal from each of the X-ray detectors 12, 14, and 16 represents one line of a rasterized X-ray image at the range of X-ray energies detected by the X-ray detector. In the course of a single scan, each of the X-ray detectors generates a signal for each line of the rasterized X-ray image. The signal processor 28 stores the signal from each of the X-ray detectors for each line of the image using the storage medium 30.

In the multiple-energy linear sweep X-ray detector 10 with the three X-ray detectors 12, 14, and 16 shown in FIG. 1, the electrical output generated by each pixel P of the X-ray detector 12 closest to the object and the X-ray source is proportional to the X-ray flux falling on the pixel at all the energies emitted by the X-ray source. The electrical output generated by each pixel of the middle X-ray detector 14 is proportional to the X-ray flux falling on the pixel at the energies emitted by the X-ray source that are not absorbed by the X-ray absorbing element 18. The electrical output generated by each pixel of the X-ray detector 16 remote from the X-ray source is proportional to the X-ray flux falling on the pixel at the energies emitted by the X-ray source that are not absorbed by the X-ray absorbing element 18 and by the absorbing element 20. Hence, the signal generated by the X-ray detector 16 is generated in response to high-energy X-rays only. The signal generated by the X-ray detector 14 is generated in response to both high-energy X-rays and medium-energy X-rays. The signal generated by the X-ray detector 12 is generated in response to high-energy X-rays, medium-energy X-rays, and low-energy X-rays.

Figure 2:
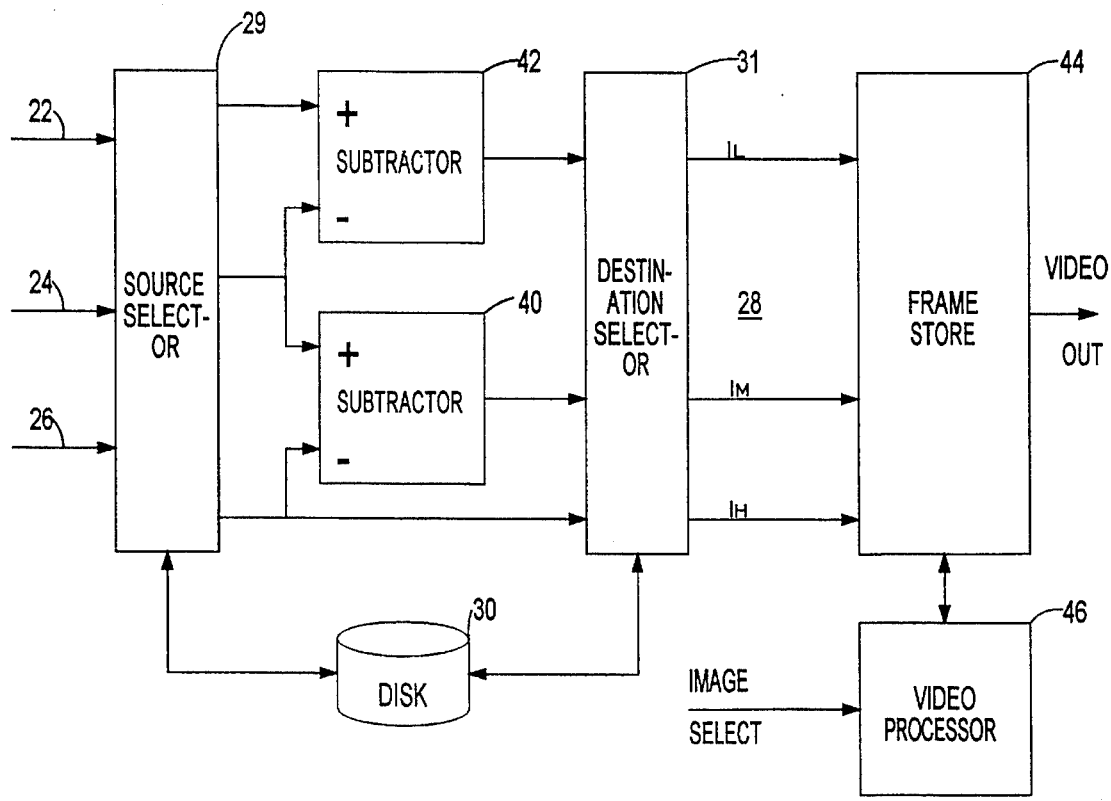
FIG. 2 is a schematic block diagram of the signal processing applied to the signals generated by the high resolution multiple-energy linear sweep X-ray detector according to the invention.

The signal processor 28 processes the signals generated by the three X-ray detectors 12, 14, and 16 to generate signals for feeding to the video monitor 32 to enable images for high-energy X-rays, medium-energy X-rays, and low-energy X-rays to be displayed on the video monitor. The processing performed by the signal processor is shown schematically in FIG. 2. The signals subject to processing may be received directly from three X-ray detectors 12, 14 and 16 via the busses 22, 24, and 26 as shown, or may be reproduced from the storage medium 30, as determined by the source selector 29.

In the processing performed by the signal processor 28, the signal generated by the X-ray detector 16 is used without change as the signal $I_H$ for displaying the image for high-energy X-rays. The signal generated by the X-ray detector 16 also fed to the subtractor 40, which also receives the signal generated by the X-ray detector 14. In the subtractor 40, the electrical output generated by each pixel of the X-ray detector 16 is subtracted from the electrical output generated by the pixel in the same position in the X-ray detector 14 to generate the signal $I_M$ for displaying the image for middle-energy X-rays. The signal generated by the X-ray detector 14 is also fed to the subtractor 42 which also receives the signal generated by the X-ray detector 12. In the subtractor 42, the electrical output generated by each pixel of the X-ray detector 14 is subtracted from the electrical output generated by the pixel in the same position in the X-ray detector 12 to generate the signal $I_L$ for displaying the image for low-energy X-rays.

Depending on the setting of the destination selector 31, the results of the signal processing performed by the signal processor 28 may be stored on the storage medium 30, and/or may fed to the frame store 44 from which the video signal for display on the video monitor 32 is derived by the video processor 46. The frame store and video processor may alternatively be located in the video monitor 32, or elsewhere.

The video monitor 32 may display the images at each range of X-ray energies separately, or the images at each range of X-ray energies may be overlaid to provide a composite image. If a composite image is displayed, the video processor 46 may apply further processing to overlay the images and to distinguish the contributions of the three separate images by shading, color, or some other suitable way. A video signal suitable for display on the video monitor 32 is read out of the frame store 44 in response to the video processor. The image displayed may be selected by an image selection signal fed into the video processor.

The signal from each of the X-ray detectors 12, 14, and 16 generated in the course of a scan can be stored using the storage medium 30 for later processing in the manner just described to generate an image for each range of X-ray energies, or for processing or transmission in other ways. Alternatively, the signals from the X-ray detectors can be processed in the manner described above, and the resulting image for each range of X-ray energies can be individually stored by the storage medium 30. As a further alternative, known techniques can be used to encode the differences between the electrical outputs generated by pixels in the same positions in each of the X-ray detectors prior to storage to reduce the amount of storage required. Finally, known still-picture compression techniques can be used to reduce further the amount of storage required.

A suitably programmed computer or digital signal processor can be used to provide the signal processor 28. Alternatively, the signal processor can be constructed using suitable integrated circuits and/or discrete components.

Figure 3:
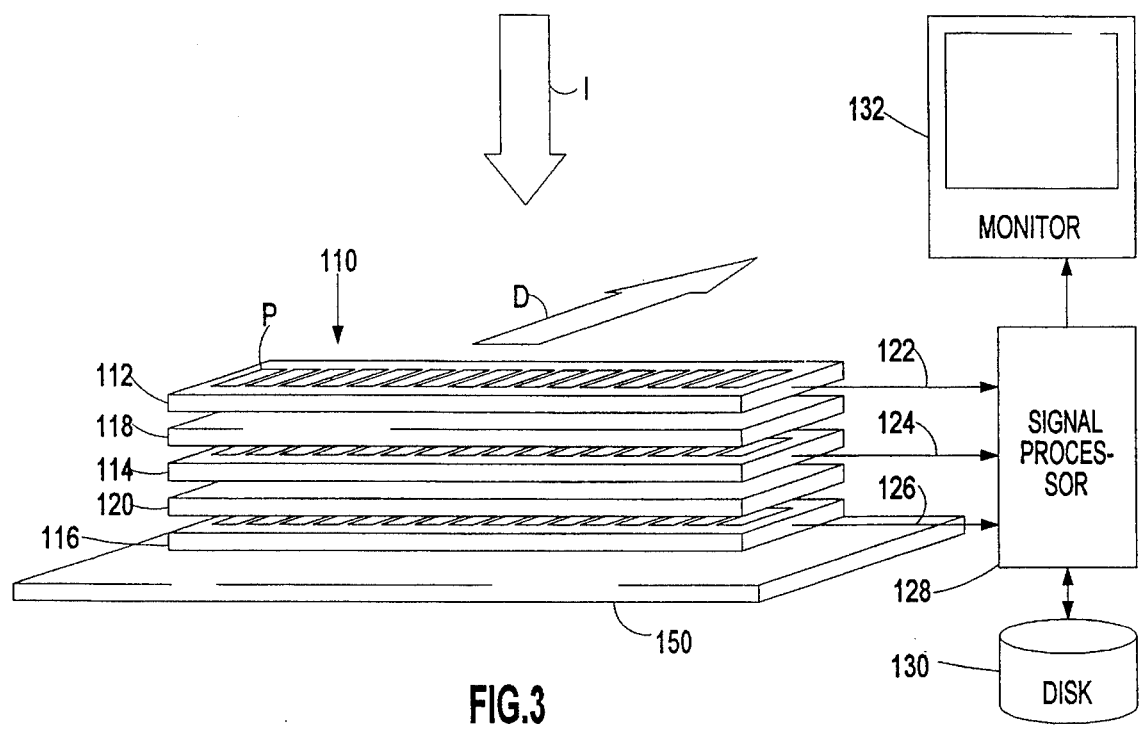
FIG. 3 is perspective view of a first practical embodiment of the high resolution multiple-energy linear sweep X-ray detector according to the invention.

FIG. 3 shows a first practical embodiment 110 of a multiple-energy linear sweep X-ray detector according to the invention. In FIG. 3, elements corresponding to those shown in FIG. 1 are indicated by the same reference numeral with 100 added. In the embodiment shown in FIG. 3, crystalline silicon linear X-ray detectors are used as the X-ray detectors 112, 114, and 116. Each crystalline silicon X-ray detector consists of a linear array of pixels, such as the pixels P, which are about 50 microns square. The thickness of each crystalline silicon X-ray detector in the direction of the incident X-rays I is about 300 microns. The length of each X-ray detector in the direction perpendicular to the direction of scanner motion D and to the direction of the incident X-rays I depends on the application, but is normally in the range of 150–250 mm. Two or more sets of X-ray detectors can be arranged in tandem to provide lengths greater than the maximum of this range.

The crystalline silicon X-ray detectors 112, 114, and 116 are stacked on the substrate 150 in the direction of the incident X-rays I. Because the crystalline silicon X-ray detectors do not significantly absorb X-rays, a foil of a suitable X-ray absorber is located in the stack of X-ray detectors upstream of each of the X-ray detectors 114 and 116 as the X-ray absorbing elements 118 and 120. Each of the X-ray absorbers is a foil of lead or some other suitable high atomic weight metal. The thickness and/or the atomic weight of each X-ray absorber is selected to provide the desired energy resolution. In the preferred embodiment, lead foils having thicknesses in the range of 40–160 microns are used.

For clarity, FIG. 3 shows a spacing between the X-ray detectors 114 and 116 and the X-ray absorbing elements 118 and 120, respectively. In practice, the stack of the X-ray detectors 112, 114, and 116 and the X-ray absorbing elements 118 and 120 is formed with adjacent elements of the stack in contact with one another. Mounting the X-ray detectors and X-ray absorbing elements in contact with one another minimizes the "chromatic aberration" resulting from the X-ray detectors not being physically coincident. The X-ray detector 116 is stacked on the substrate 150. The X-ray absorbing element 120 is stacked on the upper surface of the X-ray detector 116, which is passivated. Similarly, the X-ray absorbing element 118 is stacked on the upper surface of the X-ray detector 114, and the X-ray detector 112 is stacked on the X-ray absorbing element 118. The X-ray absorbing elements 118 and 120 are preferably grounded to the substrate 150 to provide electrical shielding between adjacent X-ray detectors.

The discrete X-ray absorbing elements 118 and 120 enable a range of multiple-energy linear sweep X-ray detectors with different energy resolutions to be made quite simply. All detectors in the range use common crystalline silicon X-ray detectors 112, 114, and 116, and different energy resolutions are provided by assembling the detectors with X-ray absorbing elements 118 and 120 of different thicknesses and/or atomic weights.

The signals from each of the X-ray detectors 112, 114, and 116 are fed to the signal processor 128 via the busses 122, 124, and 126 in a manner similar to that described above with reference to FIG. 1. The signal processing performed by the signal processor 128 is similar to that described above, and generates a video signal for display on the video monitor 132, as described above.

Figure 4:
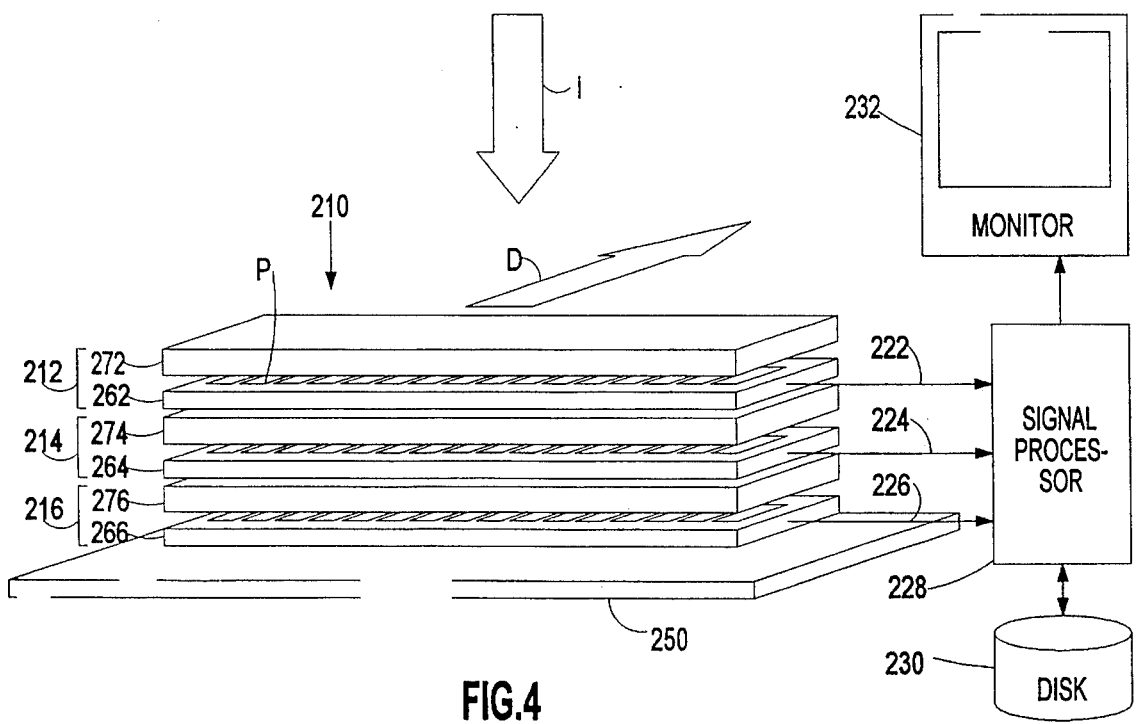
FIG. 4 is perspective view of a second practical embodiment of the high resolution multiple-energy linear sweep X-ray detector according to the invention.

FIG. 4 shows a second practical embodiment of a multiple-energy linear sweep X-ray detector according to the invention. In FIG. 4, elements corresponding to those shown in FIG. 1 are indicated by the same reference numeral with 200 added. In the multiple-energy linear sweep X-ray detector 210 shown in FIG. 4, the X-ray detectors 212, 214, and 216 are stacked on the substrate 250 in the direction of the incident X-rays I, as in the embodiment shown in FIG. 3, with the X-ray detector 212 upstream of the X-ray detector 214, and the X-ray detector 214 upstream of the X-ray detector 216. Each of the X-ray detectors 212, 214, and 216 consists of a linear array of pixels, such as the pixel P, which are preferably about 50 microns square. The thickness of each X-ray detector in the direction of the incident X-rays is about 300 microns. The length of each X-ray detector in the direction perpendicular to the direction of scanner motion D and the direction of the incident X-rays I depends on the application, but is normally in the range of 150–250 mm. Two or more sets of X-ray detectors can be arranged in tandem to provide lengths greater than the maximum of this range.

The X-ray detectors 212, 214 and 216 used in the second embodiment consist of the amorphous silicon light detectors 262, 264 and 266. The light detectors each have a major surface in which pixels, such as the pixels P, are formed. The X-ray detectors are oriented such that the surfaces in which the pixels are formed are generally perpendicular to the direction of the incident X-rays I. In the X-ray detectors 212, 214, and 216, the scintillator layers 272, 274, and 276, respectively are deposited on the surfaces in which the pixels are formed. The light detectors 262, 264, and 266 include a layer of amorphous silicon about one micron thick, and detectors respectively detect the photons of visible light respectively emitted by the scintillator layers 272, 274, and 276 in response to the incident X-rays.

Each of the scintillator layers converts X-ray photons into visible light photons by absorbing the X-ray photons. The scintillator layer 272 of the X-ray detector 212 therefore acts as the X-ray absorption element upstream of the X-ray detector 214, and the scintillator layer 272 of the X-ray detector 212 and the scintillator layer 274 of the X-ray detector 214 together act as the X-ray absorption element upstream of the X-ray detector 216. The scintillator layers 272 and 274 provide the required resolution of the incident X-rays into energy-dependent components without the need for the discrete X-ray absorbing elements 118 and 120 shown in FIG. 3.

Each of the scintillator layers 272, 274, and 276 is preferably a layer of thallium-activated cesium iodide with a thickness of about 300 microns. Other materials with scintillation properties and other activators can be used. However, cesium iodide is preferred because it is non-hygroscopic, and the wavelengths of its output of visible light are well matched to the wavelength sensitivity characteristics of amorphous silicon light detectors. Each scintillator layer is preferably grown on the surface of its respective amorphous silicon light detector with a columnar structure with at least one column of scintillator material on each pixel of the light detector. The columnar structure of the scintillator layer collimates the light generated in the scintillator layer. This reduces lateral diffusion of the light in the scintillator layer and therefore enhances the spatial resolution of the X-ray detector. The structure just described provides a resolution of about 16 line-pairs/mm.

Discrete X-ray absorbing elements (not shown) similar to the X-ray absorbing elements 118 and 120 shown in FIG. 3 may optionally be interleaved in the stack upstream of one or more of the X-ray detectors 212, 214 and 216 to change the energy resolution of the multiple-energy linear sweep X-ray detector without the need to use a scintillator layer of a different thickness. This enables the same X-ray detectors to be used in a range of multiple-energy linear sweep X-ray detectors with different energy resolutions. The thickness and/or the atomic weight of each X-ray absorbing element is selected to provide the desired energy resolution. For example, lead foils having a thickness in the range of 40–160 microns may be used.

To enable the pixels P to be shown, FIG. 4 shows a spacing between the light detectors 262, 264, and 266 and their respective scintillator layers 272, 274, and 276. In practice, as will be described in detail below, each scintillator layer is grown on the surface of its respective light detector. Moreover, the X-ray detectors 212, 214, and 216 are stacked in contact with one another without spaces between them to minimize the "chromatic aberration" resulting from the X-ray detectors not being physically coincident.

The signals from each of the X-ray detectors 212, 214, and 216 are fed to the signal processor 228 via the busses 222, 224, and 226, respectively, in a manner similar to that described above with reference to FIG. 1. The signal processing performed by the signal processor 228 is similar to that described above, and generates a video signal for display on the video monitor 232, as described above.

Figure 5:
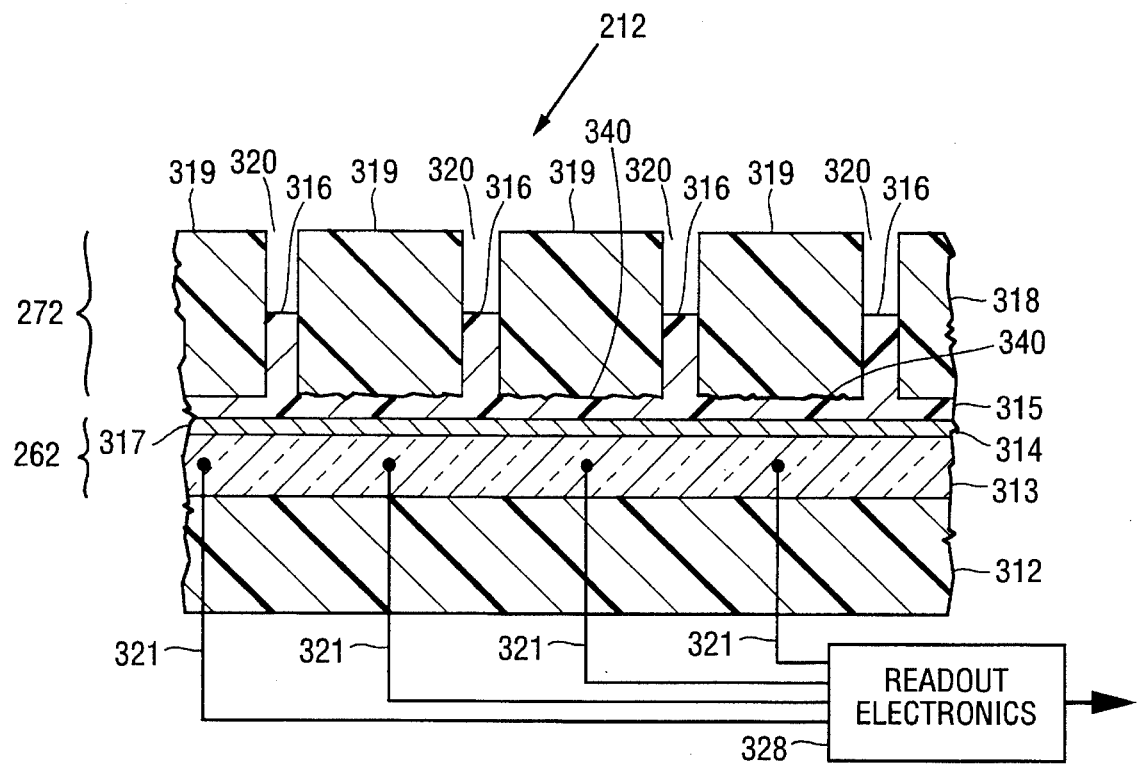
FIG. 5 is a cross-sectional view of part of one of the X-ray detectors of the second practical embodiment of the high resolution multiple-energy linear sweep X-ray detector according to the invention. The third practical embodiment has a similar structure.

The structure of the X-ray detector 212 is shown in detail in FIG. 5. The X-ray detectors 214 and 216 have an identical structure. In the X-ray detector 212 shown in FIG. 5, the light detector layer 313 is deposited on an exposed surface of the substrate 312. The substrate material may be glass, plastic, a ceramic, a thin layer of metal, such as aluminium or titanium, or a crystalline or amorphous semiconductor such as silicon or geranium. The light detector layer 313 is preferably a hydrogenated amorphous semiconductor material such as a-Si:H or a-Ge:H with a thickness in the range of one to 10 microns. The light detector layer 313 is formed with P-type, intrinsic, and N-type layers (not shown). Preferably, the P-type and N-type layers are about 0.1 micron thick, and the intrinsic layer is about 1 micron thick.

A thin, transparent, electrically-conductive layer 314 (which is not shown to scale) of a material such as indium-tin oxide, tin oxide, or another suitable thin metal film is deposited on the exposed surface of the light detector layer 313 with a thickness of between one and 100 nanometers. The conductive layer 314 is at least partly optically transparent and allows visible light photons to pass through it to the light detector layered 313.

One end of each of the electrical traces 321 is connected to the light detector layer 313 at regular intervals that define the pixels of the light detector 262, and, hence, of the X-ray detector 212. The other end of each of the electrical traces is connected to the read out electronics 328 that receive and amplify the electrical signals generated within the light detector layer.

Figure 6:
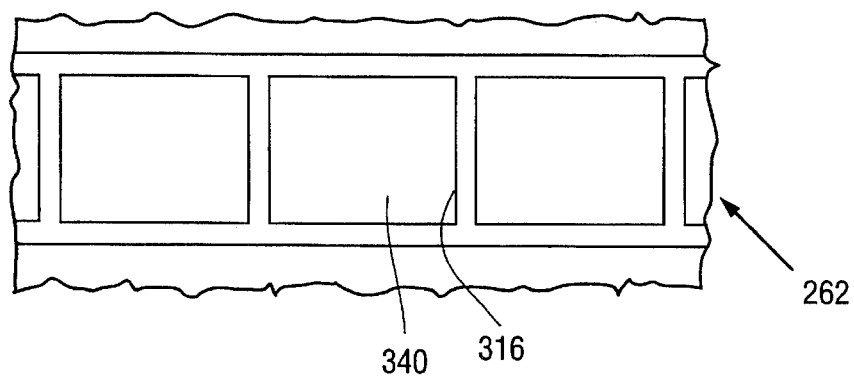
FIG. 6 illustrates the structure of the etched pattern layer in the second practical embodiment of the high resolution multiple-energy linear sweep X-ray detector according to the invention.

The pattern layer 315 of an etchable pattern material, such as polyimide resin, silicon dioxide or a metal such as aluminium, chromium, gold, silver, palladium or platinum, with a thickness of between 5 and 20 microns is then deposited on the exposed surface of the conductive layer 314 as shown. Portions of the pattern layer defined by conventional photo-lithography techniques are etched away to produce a linear array of pits 340 in the pattern material 315. The pits are bounded by the pattern layer, which, in the length dimension, forms the regularly-spaced ridges 316, as shown in FIG. 6. The pits 340 are circular, oval, square, rectangular, or some other suitable shape, and coincide with the pixels of the light detector layer 313.

The ridges 316 project approximately perpendicularly to the surface 317 of the conductive layer 314. The ridges 316 are preferably between about five and 20 microns high, and are between about two and 20 microns wide, and are spaced apart by between about 10 and 100 microns, i.e., the pits 340 are between about 10 and 100 microns wide, and are preferably about 50 microns wide. Preferably, a photosensitive polyimide layer 10–15 microns thick is used as the etchable pattern material, and the pits are defined by conventional photo-lithography techniques. The exposed polyimide film is then etched and rinsed leaving the ridges 316.

When the etchable pattern material 315 is etched, a small portion of this material may be allowed to remain on the surface 317 of the conductive layer 314 (as shown in FIG. 5), or the etchable pattern material may be removed down to the surface 317, except for the ridges 316. If the etchable pattern material is completely removed from the surface 317, the surface 317 might be protected by depositing a thin layer (not shown in FIG. 5) of an etch stop material such as a native oxide or silicon nitride, as is well known in the art.

The scintillator layer 272 is grown on the surface 317 and over the ridges 316 of the light detector by vacuum deposition. The scintillator layer 272 is preferably a layer of thallium-activated cesium iodide having a thickness in the range of 100–1000 microns. The preferred thickness of the scintillator layer is 300 microns. For maximum light output, the thallium-activated cesium iodide is grown slowly at a growth rate less than 250 microns/hour, and preferably at less than 180 microns/hour.

The light detector 262 is initially heated to a low temperature, in the range of 100°–250° C., and preferably in the range of 100°–150° C. During the growing process, cooling is required to maintain the required temperature due to the release of latent heat by the condensing cesium iodide. Because of the large difference in the vapor pressures of cesium iodide and thallium, it is impractical to deposit thallium-activated cesium iodide itself. Instead, cesium iodide and dopant thallium iodide are evaporated in separate boats operated at different temperatures according to the desired composition ratio (at least 0.02 mole percentage, and preferably in the range of 0.1–0.2 mole percentage).

The vacuum deposition process produces a cylinder or column 319 of the scintillator material based on each of the pits 340. Adjacent columns are separated by an air or vacuum gap 320 because of the presence of the ridges 316 on the surface 317. Each column is composed of many pillar-like crystals of thallium-activated cesium iodide, each several microns in diameter, growing almost perpendicularly from the surface 317. The tendency of the columns to spread towards their tops, and hence to merge, can be reduced by annealing the X-ray detector 212 at about 500° C. for about 30 minutes. Annealing also increases the light output of the deposited scintillator layer.

An X-ray photon impinging upon the X-ray detector 212 shown in FIG. 5 first encounters the scintillator material in one of the columns 319, and all or part of the energy of the X-ray photon is converted into light photons having a wavelength in the range between 0.3 and 0.7 microns. Such photons propagate generally towards the surface 317 and will encounter and/or will be reflected from the wall of the column 319 in which the photon was originally produced. If the angle of incidence of the photon relative to the column wall is sufficiently large (i.e., if the angle of incidence is greater than the critical angle of the scintillator material), the photon will undergo total internal reflection at the column wall, and will remain within and propagate within the column in which it was originally produced. This mechanism traps the visible light photons generated in response to an X-ray photon within the column 319 in which they were originally generated, and greatly enhances the special resolution of the X-ray detector.

An opaque material (not shown) may be introduced into the spaces 320 between the columns 319 to absorb light that passes through the walls of the columns. This prevents the light that passes through the wall of a column from being detected by an adjacent pixel of the light detector 262.

As will be described in more detail below, thin-film switching diodes or some other form of switching element may be constructed in the light detector layer 313, and may be connected between a suitable activation line and the electrical trace 321 connected to each pixel of the light detector 262 to feed the electrical output of each pixel to the readout electronics 328. The readout electronics can be formed on or in the substrate 312.

Figure 7A:
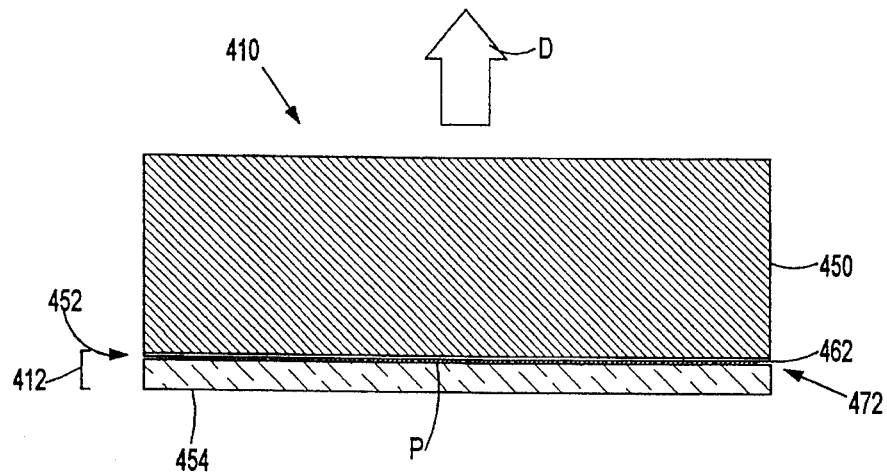
FIG. 7A is a top view of a third practical embodiment of the high resolution multiple-energy linear sweep X-ray detector according to the invention, i.e., a view in the direction of the incident X-rays.
Figure 7B:
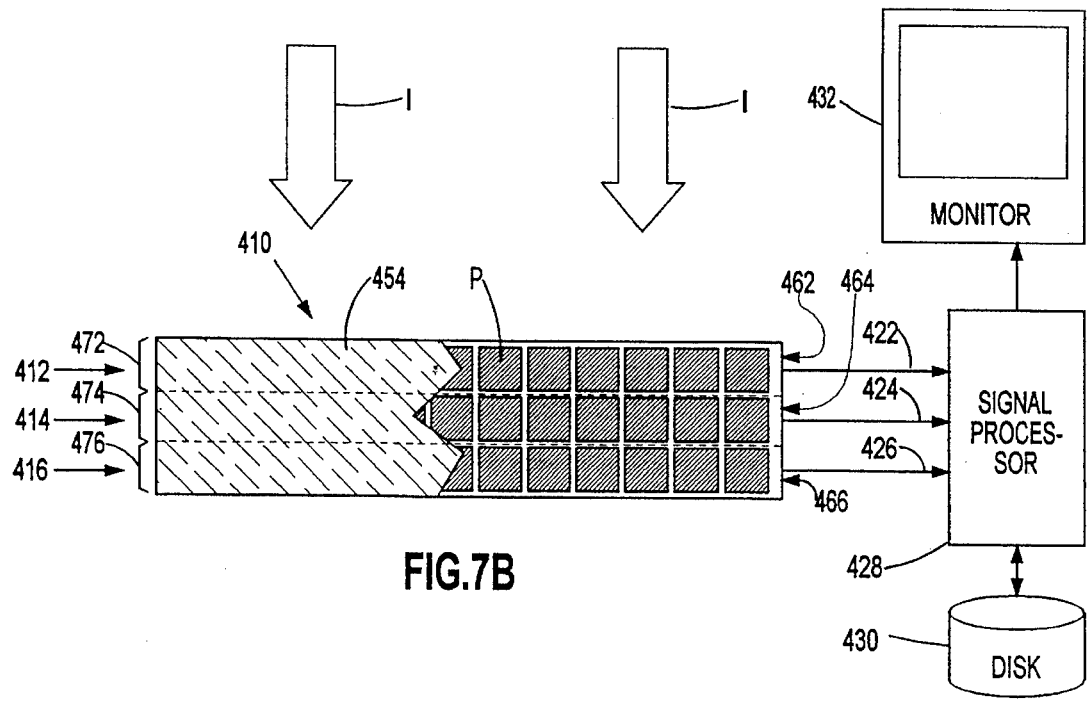
FIG. 7B is a front view of a third practical embodiment of the high resolution multiple-energy linear sweep X-ray detector according to the invention, i.e., a view in the direction of movement of the scanner.

A third practical embodiment of the invention is shown in FIGS. 7A and 7B. In FIGS. 7A and 7B, elements corresponding to those shown in FIG. 1 are indicated by the same reference numeral with 400 added.

In the third practical embodiment, the entire multiple-energy linear sweep X-ray detector 410 is constructed on the single substrate 450. FIG. 7A shows a top view of the multiple-energy linear sweep X-ray detector 410, and FIG. 7B shows a front view. Part of the scintillator layer 454 is cut away to show the underlying light detectors 462, 464, and 466. Unlike the first and second practical embodiments shown in FIGS. 3 and 4, in which the surfaces in which the pixels are formed are disposed perpendicularly to the direction of the incident X-rays I, the pixels of the light detectors 462, 464, and 466 are formed in the surface of the light detector layer 452 which is disposed parallel to the incident X-rays. The light detector layer 452 is formed on the substrate 450, which is disposed parallel to the incident X-rays, and is overlaid by the scintillator layer 454. The three X-ray detectors 412, 414, and 416 are formed side-by-side in the light detector layer 452 and the scintillator layer 454. The orientation of the substrate 450 stacks the X-ray detectors 412, 414, and 416 in the direction of the incident X-rays, with the X-ray detector 412 upstream of the X-ray detector 414, and the X-ray detector 414 upstream of the X-ray detector 416.

The three X-ray detectors together have a total depth in the direction of the incident X-rays of about 250 microns. The length of the three X-ray detectors in the direction perpendicular to the direction of scanner motion D and to the direction of the incident X-rays I depends on the application, but is normally in the range of 150–250 mm. Two or more sets of three X-ray detectors can be arranged in tandem to provide lengths greater than the maximum of this range. More or fewer X-ray detectors can be formed side-by-side on the substrate 450 as desired.

Each of the X-ray detectors 412, 414 and 416 includes a light detector 462, 464, and 466, respectively, which are formed side-by-side in the light detector layer 452 deposited on the substrate 450. The light detector layer 452 is a layer of hydrogenated amorphous silicon with P-type and N-type regions that define each of the pixels, such as the pixels P. In this embodiment, the pixels are elongated in the direction of the incident X-rays. For example, the pixels are about 80 microns in the direction of the incident X-rays and about 50 microns in the direction perpendicular to the incident X-rays I and perpendicular to the direction of scanner motion D.

The scintillator layer 454 is deposited on the surface of the light detector layer 452. The scintillator layer 454 is preferably a layer of thallium-activated cesium iodide. Other materials with scintillation properties and other activators can be used. However, cesium iodide is preferred because it is non-hygroscopic, and the wavelengths of its output of visible light are well matched to the wavelength sensitivity characteristics of amorphous silicon light detectors. As described above with reference to FIG. 5, the scintillator layer is preferably grown on the surface of the light detector layer with a columnar structure having at least one column of scintillator material on each pixel formed in the light detector layer. The columnar structure of the scintillator layer collimates the light generated in the scintillator layer. This reduces lateral diffusion of the light in the scintillator layer and therefore enhances the spatial resolution of the X-ray detector.

The scintillator layer preferably has a thickness that is approximately equal to the dimension of the pixels in the direction perpendicular to the incident X-rays, i.e., about the 50 microns in this embodiment. A scintillator layer of this thickness deposited on pixels having a dimension of 50 microns in the direction perpendicular to the incident X-rays provides the same spatial resolution as the 50 micron square pixels of the embodiments shown in FIGS. 3 and 4, i.e., about 16 line-pairs/mm.

The light detectors 462, 464, and 466 are respectively overlaid by the portions 472, 474, and 476 of the scintillator layer 454. Again, as described above, the scintillator layer 454 converts X-ray photons into visible light photons by absorbing the X-ray photons. Accordingly, the portion 472 of the scintillator layer acts as the X-ray absorption element upstream of the X-ray detector 414. The portions 472 and 474 of the scintillator layer 474 together act as the X-ray absorption element upstream of the X-ray detector 466. The portions 472 and 474 of the scintillator layer provide the required resolution of the incident X-rays into energy-dependent components without the need for the discrete X-ray absorbing elements similar to the discrete X-ray absorbing elements 118 and 120 shown in FIG. 3.

Figure 8A:
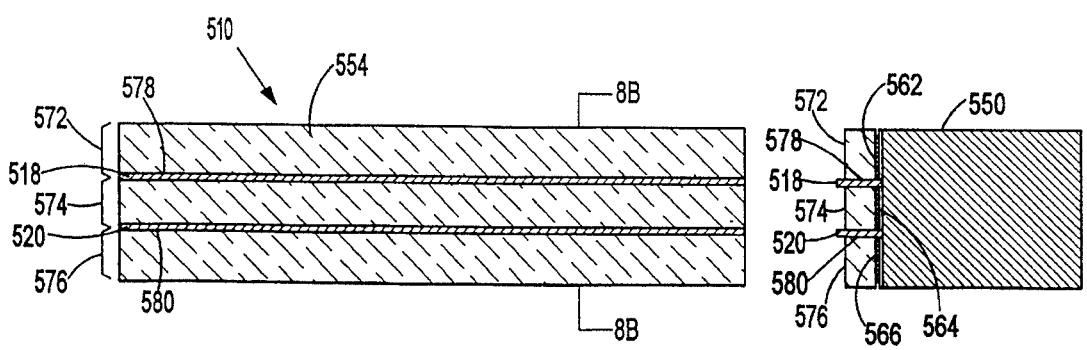
FIG. 8A is a front view of a variation on the third practical embodiment of the high resolution multiple-energy linear sweep X-ray detector according to the invention. This variation provides an energy resolution different from that provided by absorption by the scintillator layer alone.
Figure 8B:
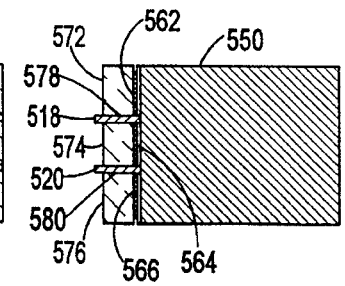
FIG. 8B is a cross sectional view of the variation on the third practical embodiment of the high resolution multiple-energy linear sweep X-ray detector according to the invention along the line 8B—8B.

The energy resolution of the embodiment shown in FIGS. 7A and 7B is different from that of the embodiment shown in FIG. 4 because the dimension of the scintillator layer 454 in the direction of the incident X-rays (about 80 microns) is less than the thickness of the scintillator layer (about 300 microns) of each X-ray detector in the embodiment shown in FIG. 4. FIGS. 8A and 8B shows a variation on the embodiment shown in FIGS. 7A and 7B in which the energy resolution is changed from that provided by absorption by the portions 472 and 474 of the scintillator layer 454. In FIGS. 8A and 8B, elements corresponding to those shown in FIGS. 7A and 7B are indicated by the same reference numeral with 100 added. In FIGS. 8A and 8B, the scintillator layer 554 divided into the portions 572, 574, and 576 by the channels 578 and 580, into which one or more discrete X-ray absorbing elements, such as the discrete X-ray absorbing elements 518 and 520, may be inserted to change the energy resolution of the multiple-energy linear sweep X-ray detector 510 from that provided by absorption by the scintillator layer 554. This enables an energy resolution similar to that provided by the embodiment shown in FIG. 4 to be obtained. This also allows the same light detector/scintillator layer structure to be used in a range of multiple-energy linear sweep X-ray detectors with different energy resolutions. The thickness and/or the atomic weight of each X-ray absorbing element is selected to provide the desired energy resolution. For example, lead foils in the range of 40–160 microns may be used.

Figure 9:
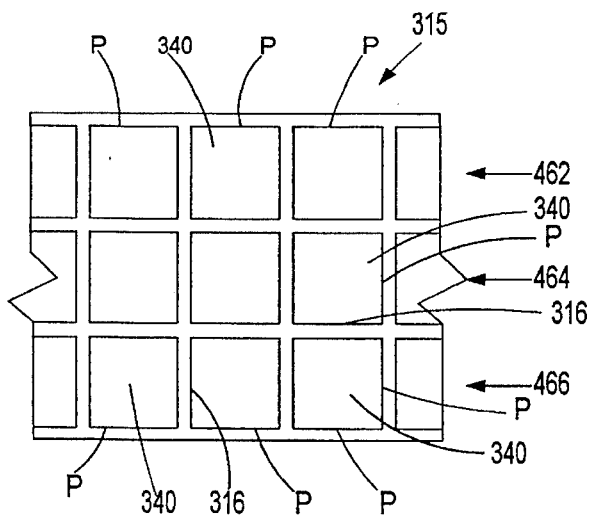
FIG. 9 illustrates the structure of the etched pattern layer in the third practical embodiment of the high resolution multiple-energy linear sweep X-ray detector according to the invention.

The construction of the embodiment shown in FIGS. 7A and 7B is similar to that described above with reference to FIG. 5, and so will not be described in full detail here. The two-dimensional array of pixels P shown in FIG. 7B is formed in the light detector layer 452, which corresponds to the light detector layer 313, the conductive layer 314, and the pattern layer 315 shown in FIG. 5. FIG. 9 shows how the pattern layer 315 is etched to provide a pit 340 over each pixel P of the light detector layer 452. Adjacent pits 340 are separated by the ridges 316. The scintillator layer 454 is grown on the surface 317 (FIG. 5) to provide a two-dimensional array of columns 319 (FIG. 5). The construction of the variation shown in FIGS. 8A and 8B is similar.

The signals from each of the X-ray detectors 412, 414, and 416 are fed to the signal processor 428 via the busses 422, 424, and 426, respectively, in a manner similar to that described above with reference to FIG. 1. The signal processing perforated by the signal processor 428 is similar to that described above, and generates a video signal for display on the video monitor 432, as described above.

Figure 10:
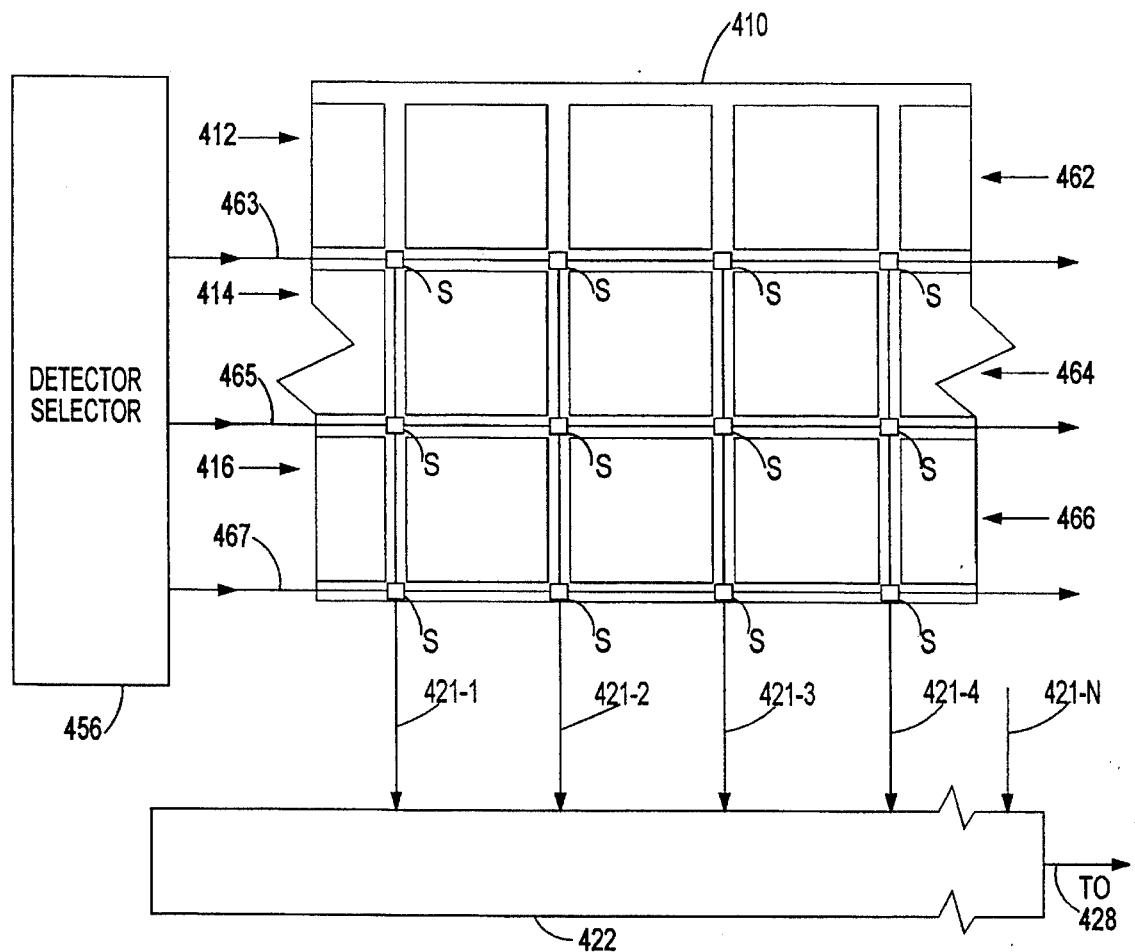
FIG. 10 illustrates an arrangement for reading out the outputs from the pixels of the X-ray detectors of the third practical embodiment of the high resolution multiple-energy linear sweep X-ray detector according to the invention.

The circuit arrangement shown in FIG. 10 may be used to feed the signal from each pixel P of the multiple-energy linear sweep X-ray detector 410 to the signal processor 428. In this arrangement, a switching element S for each of the pixels P is formed in the light detector layer. The switching elements could be thin-film field-effect transistors, single diodes or a back-to-back arrangement of two diodes. The control inputs (e.g., the thin-film FET) of the switching elements of each of the light detectors 462, 464, and 466 are all connected to the respective one of the detector select lines 463, 465, and 467. The input of each switching element S is connected to the pixel P to which the switching element belongs. The outputs of the switching elements of the pixels in the same position in each of the light detectors 462, 464, and 466 are connected to the output lines 421-1, 421-2, 421-3 . . . 421-N, which feed the readout electronics 422. The detector selector 456 sequentially selects the pixel outputs from the light detectors 462, 464, and 466 by sequentially activating the detector select lines 463, 465, and 467, respectively. The readout electronics 422 feed the output signal for each of the X-ray detectors 412, 414, and 416 to the signal processor 428 for processing as described above. The signal from each of the X-ray detectors 412, 414, and 416 may be fed to the signal processor 428 sequentially, or the electrical outputs of the pixels in the same position in each of the X-ray detectors may be sequentially fed to the signal processor 428, depending on the timing of the detector select signals from the detector selector 456.

Although illustrative embodiments of the invention have been described herein in detail, it is to be understood that the invention is not limited to the precise embodiments described, and that various modifications may be practiced within the scope of the invention defined by the appended claims.

We claim:

1. Apparatus for generating, in a single scan and in response to incident X-rays received from an object, plural electrical signals, each electrical signal representing an image of the object at a different range of energies of the incident X-rays, the apparatus comprising:

a first X-ray detector, including:
 a first light detector having a first surface disposed substantially parallel to the incident X-rays, wherein the first light detector has a linear array of first pixels, each of the first pixels producing an electrical output in response to the incident X-rays in a first range of energies,
 a first scintillator layer comprising columns of scintillator material grown on the first surface, and
 means for generating a first electrical signal in response to the electrical output of each of the first pixels;

a second X-ray detector stacked upstream of the first X-ray detector, the second X-ray detector including:
 a second light detector having a second surface disposed substantially parallel to the incident X-rays, wherein the second light detector has a linear array of second pixels, each of the second pixels producing an electrical output in response to the incident X-rays in a second range of energies, broader than the first range of energies,
 a second scintillator layer comprising columns of scintillator material grown on the second surface, and
 means for generating a second electrical signal in response to the electrical output of each of the second pixels, wherein the first scintillator layer provides an energy-dependent absorption of the incident X-rays before said incident X-rays are incident at the second scintillator layer.

2. The apparatus of claim 1, wherein the first light detector and the second light detector each include an amorphous semiconductor material.

3. The apparatus of claim 2, wherein:
the first scintillator layer comprises plural columns of the scintillator material formed substantially perpendicularly to the first surface, at least one column of the scintillator material being formed overlying each of the first pixels; and
the second scintillator layer comprises plural columns of the scintillator material formed substantially perpendicularly to the second surface, at least one column of the scintillator material being formed overlying each of the second pixels.

4. The apparatus of claim 1, wherein the first scintillator layer is separated by a groove from the second scintillator layer, the apparatus also including:
an X-ray absorbing foil mounted in the groove.

5. The apparatus of claim 1, wherein the first light detector and the second light detector are formed side-by-side along a single light detector layer having a photon receiving surface, the first surface is a first portion of the photon receiving surface, the second surface is a second portion of the photon receiving surface, the first pixels and the second pixels are formed in parallel linear arrays along the single light detector layer, the first scintillator layer and the second scintillator layer are portions of a larger scintillator layer, the first scintillator layer is a portion of the larger scintillator layer which overlies the first portion of the photon receiving surface, and the second scintillator layer is another portion of the larger scintillator layer which overlies the second portion of the photon receiving surface.

6. The apparatus of claim 1, wherein the scintillator material is thallium-activated cesium iodide.

7. The apparatus of claim 6, wherein each of the first scintillator layer and the second scintillator layer includes columns of thallium-activated cesium iodide.

8. Apparatus for generating, in a single scan and in response to incident X-rays received from an object, plural electrical signals, each electrical signal representing an image of the object at a different range of energies of the incident X-rays, the apparatus comprising:
a first X-ray detector, including:
a first light detector having a first surface disposed substantially perpendicularly to the incident X-rays and including a linear array of first pixels formed in the first surface, and a first scintillator layer comprising columns of scintillator material grown on the first surface, each of the first pixels producing an electrical output in response to the incident X-rays in a first range of energies, and
means for generating a first electrical signal in response to the electrical output of each of the first pixels; and
a second X-ray detector stacked upstream of the first X-ray detector, the second X-ray detector including:
a second light detector having a first surface disposed substantially perpendicularly to the incident X-rays and including a linear array of second pixels formed in the second surface, and a second scintillator layer comprising columns of the scintillator material grown on the second surface, the second scintillator layer providing an energy-dependent absorption of the incident X-rays before said incident X-rays are incident at the first X-ray detector, each of the second pixels generating an electrical output in response to the incident X-rays in a second range of energies, broader than the first range of energies, and
means for generating a second electrical signal in response to the electrical output of each of the second pixels.

9. The apparatus of claim 8, wherein:
the first scintillator layer comprises plural columns of the scintillator material formed substantially perpendicularly to the surface of the first light detector, at least one column of said scintillator material being formed overlying each of the first pixels; and
the second scintillator layer comprises plural columns of said scintillator material formed substantially perpendicularly to the surface of the second light detector, at least one column of said scintillator material being formed overlying each of the second pixels.

10. The apparatus of claim 9, wherein the first light detector and the second light detector each include an amorphous semiconductor material.

11. The apparatus of claim 8, wherein the scintillator material is thallium-activated cesium iodide.

12. Apparatus for generating, in a single scan and in response to incident X-rays received from an object, plural electrical signals, each electrical signal representing an image of the object at a different range of energies of the incident X-rays, the apparatus comprising:
a light detector layer having a surface disposed substantially parallel to the incident X-rays;
a scintillator layer comprising columns of scintillator material grown on the surface; and
a first X-ray detector and a second X-ray detector formed side-by-side in the light detector layer and the scintillator layer;
the first X-ray detector including:
a linear array of first pixels formed in a first portion of the light detector layer, and a first portion of the scintillator layer overlaying the first pixels, each of the first pixels generating an electrical output in response to the incident X-rays in a first range of energies; and
means for generating a first electrical signal in response to the electrical output of each of the first pixels, and
the second X-ray detector including:
a linear array of second pixels formed in a second portion of the light detector layer, the linear array of second pixels being disposed parallel to and upstream of the linear array of first pixels, and a second portion of the scintillator layer overlaying the second pixels, the second portion of the scintillator layer providing an energy-dependent absorption of the incident X-rays before said incident X-rays are incident at the first portion of the scintillator layer, each of the second pixels generating an electrical output in response to the incident X-rays in a second range of energies, broader than the first range of energies; and
means for generating a second electrical signal in response to the electrical output of each of the second pixels.

13. The apparatus of claim 12, wherein the scintillator layer comprises plural columns of scintillator material formed substantially perpendicularly to the surface of the light detector layer, at least one column of scintillator material being formed on each of the first pixels and on each of the second pixels.

14. The apparatus of claim 13, wherein the light detector layer includes an amorphous semiconductor material.

15. The apparatus of claim 12, wherein:

the scintillator layer includes a groove separating the first portion from the second portion; and the apparatus additionally comprises an X-ray absorbing foil mounted in the groove.

16. The apparatus of claim 12, wherein the first pixels and the second pixels are elongate in a direction parallel to the incident X-rays.

17. The apparatus of claim 12, wherein the scintillator material is thallium-activated cesium iodide.

18. Apparatus for generating, in a single scan and in response to incident X-rays received from an object, plural electrical signals, each electrical signal representing an image of the object at a different range of energies of the incident X-rays, the apparatus comprising:

a first X-ray detector, including:
  a first light detector having a first surface disposed substantially perpendicularly to the incident X-rays, wherein the first light detector has a linear array of first pixels, each of the first pixels producing an electrical output in response to the incident X-rays in a first range of energies,
  a first scintillator layer that has been grown on the first surface, and
  means for generating a first electrical signal in response to the electrical output of each of the first pixels;

a second X-ray detector stacked upstream of the first X-ray detector, the second X-ray detector including:
  a second light detector having a second surface disposed substantially perpendicularly to the incident X-rays, wherein the second light detector has a linear array of second pixels, each of the second pixels producing an electrical output in response to the incident X-rays in a second range of energies, broader than the first range of energies,
  a second scintillator layer that has been grown on the second surface, and
  means for generating a second electrical signal in response to the electrical output of each of the second pixels, wherein the first scintillator layer provides an energy-dependent absorption of the incident X-rays before said incident X-rays are incident at the second scintillator layer.

* * * * *